(12) United States Patent
Freidhof

(10) Patent No.: US 12,500,595 B2
(45) Date of Patent: Dec. 16, 2025

(54) FOURIER TRANSFORM CIRCUIT, SIGNAL PROCESSING CIRCUIT, AND SIGNAL PROCESSING METHOD

(71) Applicant: Rohde & Schwarz GmbH & Co. KG, Munich (DE)

(72) Inventor: Markus Freidhof, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 89 days.

(21) Appl. No.: 18/639,018

(22) Filed: Apr. 18, 2024

(65) Prior Publication Data
US 2025/0330190 A1    Oct. 23, 2025

(51) Int. Cl.
    *H03M 1/10*       (2006.01)
    *H03M 1/12*       (2006.01)

(52) U.S. Cl.
    CPC ....... *H03M 1/1085* (2013.01); *H03M 1/1245* (2013.01)

(58) Field of Classification Search
CPC .......................... H03M 1/1085; H03M 1/1245
USPC ........................................................ 341/120
See application file for complete search history.

(56) References Cited

U.S. PATENT DOCUMENTS

| | | | | |
|---|---|---|---|---|
| 5,365,470 A * | 11/1994 | Smith | ................... | H04L 27/144 |
| | | | | 708/406 |
| 5,805,485 A * | 9/1998 | Ito | ................... | G06F 17/142 |
| | | | | 708/409 |
| 5,808,925 A * | 9/1998 | Ito | ................... | G06F 17/142 |
| | | | | 708/406 |
| 7,461,114 B2 * | 12/2008 | Nakazuru | ............ | G06F 17/142 |
| | | | | 708/405 |
| 10,776,451 B2 * | 9/2020 | Goswami | .............. | G06F 17/142 |
| 2003/0046322 A1 * | 3/2003 | Guevorkian | ........... | G06F 17/148 |
| | | | | 708/400 |
| 2004/0039765 A1 * | 2/2004 | Nakazuru | ............. | G06F 17/142 |
| | | | | 708/404 |
| 2004/0172435 A1 * | 9/2004 | Goel | ................... | H04L 27/2651 |
| | | | | 708/404 |
| 2006/0224651 A1 * | 10/2006 | Madhavapeddi | ..... | G06F 17/142 |
| | | | | 708/404 |

(Continued)

OTHER PUBLICATIONS

Garrido, M., "A Survey on Pipelined FFT Hardware Architectures," Journal of Signal Processing Systems (2022) 94:1345-1364. <https://doi.org/10.1007/s11265-021-01655-1>.

*Primary Examiner* — Zhen Y Wu
(74) *Attorney, Agent, or Firm* — CHRISTENSEN O'CONNOR JOHNSON KINDNESS PLLC

(57) ABSTRACT

A FT circuit includes a distribution circuit, a number N of pipeline FT circuits, and a number M of parallel FT circuits, wherein N and M are integers greater than or equal to 2. The distribution circuit is configured to receive a plurality of samples, to divide the plurality of samples into N subsets of samples, and to forward each of the N subsets of samples to a dedicated one of the pipeline FT circuits. The pipeline FT circuits are arranged in parallel to each other and are configured to process M samples in parallel, thereby obtaining M intermediate samples per pipeline FT circuit. The pipeline FT circuits are configured to forward each of the M intermediate samples to a dedicated one of the M parallel FT circuits. Each parallel FT circuit is configured to process N intermediate samples in parallel, thereby obtaining N output samples per parallel FT circuit.

20 Claims, 4 Drawing Sheets

(56) References Cited

U.S. PATENT DOCUMENTS

2006/0288068 A1* 12/2006 Uehara ................ G06F 17/142
 708/400
2017/0168989 A1* 6/2017 Goswami .............. G06F 17/142
2020/0142947 A1* 5/2020 Goswami .............. G06F 17/142

* cited by examiner

FOURIER TRANSFORM CIRCUIT, SIGNAL PROCESSING CIRCUIT, AND SIGNAL PROCESSING METHOD

FIELD OF THE DISCLOSURE

Embodiments of the present disclosure generally relate to a Fourier transform circuit. Embodiments of the present disclosure further relate to a signal processing circuit, and to a signal processing method of processing a plurality of samples by a Fourier transform.

BACKGROUND

Fast Fourier transforms, FFTs, are employed in a plurality of different test and/or measurement applications such as spectrum analysis, RF signal monitoring, time domain electromagnetic interference analysis, signal equalization, particularly signal filtering with finite impulse response filters in frequency domain, etc.

The corresponding Fourier transform, FT, circuits usually comprise a number of sequential FT circuits that are arranged in parallel to each other and that each process single samples sequentially, as well as a single parallel FT circuit that receives and processes the samples processed by all of the serial FT circuits.

The FT circuits performing the FFT are subject to competing requirements. While it is in general desirable to increase the data rate of the FT circuits, particularly for processing signals with high bandwidths up to several GHz, this usually comes at the cost of increased hardware resources and increased power consumption.

Thus, there is a need for a Fourier transform circuit, a signal processing circuit, and a signal processing method that allow for performing Fourier transforms more efficiently.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a Fourier transform (FT) circuit. In an embodiment, the FT circuit comprises a distribution circuit, a first number N of pipeline FT circuits, and a second number M of parallel FT circuits, wherein N is an integer greater than or equal to 2, and wherein M is an integer greater than or equal to 2. The distribution circuit is configured to receive a plurality of samples and to divide the plurality of samples into N subsets of samples. The distribution circuit is also configured to forward each of the N subsets of samples to a dedicated one of the pipeline FT circuits, respectively. The pipeline FT circuits are arranged in parallel to each other, wherein each pipeline FT circuit is configured to process M samples in parallel, thereby obtaining M intermediate samples per pipeline FT circuit. The pipeline FT circuits are also configured to forward each of the M intermediate samples to a dedicated one of the M parallel FT circuits, respectively. The parallel FT circuits are arranged in parallel to each other. Each parallel FT circuit is configured to process N intermediate samples in parallel, thereby obtaining N output samples per parallel FT circuit.

In general, the plurality of samples received by the distribution circuit corresponds to an input signal of the FT circuit, while the output samples of the parallel FT circuits correspond to an output signal of the FT circuit.

The FT circuit according to embodiments of the present disclosure performs an FFT on the input signal as described above, thereby obtaining the output signal. In other words, the output signal is the FT of the input signal.

In an embodiment, the input signal of the FT circuit may be time domain signal, and the output signal may be a frequency domain signal, or vice versa.

The FT circuit according to embodiments of the present disclosure is based on the idea to combine a plurality of pipeline FT circuits with a plurality of parallel FT circuits. Therein, the pipeline FT circuits have a parallelism of at least 2, i.e. they each receive and process at least two samples simultaneously. Further, at least two parallel FT circuits are provided downstream of the pipeline FT circuits.

In an embodiment, each pipeline FT circuit receives and processes exactly one of the N subsets of samples.

In an embodiment, the plurality of input samples may be distributed equally into the N subsets of samples.

In an embodiment, all samples received by the distribution circuit may be distributed into the N subsets of samples. The N subsets may comprise M samples each, such that the pipeline FT circuits process all samples of the N subsets simultaneously. If the N subsets comprise more than M samples each, the samples may be queued for processing by the pipeline FT circuits.

In an embodiment, the M different intermediate samples output by each pipeline FT circuit are forwarded to different ones of the parallel FT circuits, i.e. each intermediate sample of a respective pipeline FT circuit is forwarded to a dedicated one of the parallel FT circuits.

The inventors have discovered that in spite of more parallel FT circuits being required compared to solutions known in the state of the art, which use a single parallel FT circuit, the overall hardware resource requirements and energy consumption is reduced significantly compared to the state of the art FT circuits. This economization is mainly due to the fact that the number of pipeline FT circuits necessary is significantly smaller than the number of sequential FT circuits necessary in the state of the art, namely by a factor of M, which is at least two.

According to an aspect of the present disclosure, the FT circuit, for example, further comprises a multiplication circuit, wherein the multiplication circuit is arranged between the pipeline FT circuits and the parallel FT circuits. In an embodiment, the multiplication circuit is configured to multiply M*N or M*(N−1) of the intermediate samples with a twiddle factor, respectively. In an embodiment, different intermediate samples may be multiplied with different twiddle factors $W\_N^k = e^{\wedge}(-j \cdot 2\pi k/N)$.

In an embodiment, the M intermediate samples of one of the N pipeline FT circuits have to be multiplied with $W\_N^0 = 1$.

Accordingly, all M*N intermediate samples may be fed to a respective multiplication sub-circuit that is configured to multiply the received sample with a respective twiddle factor, wherein M of the twiddle factors are 1.

Alternatively, M*(N−1) intermediate samples are fed to a respective multiplication sub-circuit that is configured to multiply the received sample with a respective twiddle factor that is different from 1. The M remaining intermediate samples may not be fed to a multiplication sub-circuit.

In an embodiment of the present disclosure, lengths of the pipeline FT circuits are adjustable. By adjusting the lengths of the pipeline FT circuits, the length of the FT performed by the FT circuit can be adapted, for example during operation of the FT circuit.

In general, the total length of the FFT performed by an FT circuit is given by the length of the pipeline FT circuits times the length of the parallel FT circuits.

In an embodiment, the respective length of the pipeline FT circuits is adjustable, for example adjustable during operation of the FT circuit.

In another embodiment, the respective length of the parallel FT circuits may be fixed. In other words, the respective length of the parallel FT circuits may not be adjustable during operation of the FT circuit.

In an embodiment, all pipeline FT circuits have the same length. Accordingly, the length of all pipeline FT circuits may be adapted simultaneously.

In an embodiment, the lengths may each be greater than or equal to 1, for example greater than or equal to 2. Thus, the lengths of the pipeline FT circuits may be adjustable to have an arbitrary length greater than or equal to 1, for example greater than or equal to 2.

Optionally, the lengths may have an upper limit. For example, the lengths may be smaller than or equal to 2048, or smaller than or equal to 4096.

Thus, in a certain example, the length of the pipeline FT circuits may be adjustable within the range between and including 1 or 2, up to and including 2048 or 4096.

In an embodiment, the length of the pipeline FT circuits may be equal to $M^q$, wherein q is 0 or an integer. However, it is to be understood that the pipeline FT circuits may have any other length.

Thus, for example, the length of the FFT performed by the FT circuit may be adjusted between $1*M*P$ and $4096*M*P$, wherein P is the respective parallelism of the parallel FT circuits. However, it is to be understood that the upper limit is optional.

In an embodiment, P may be equal to 4, 8, 16, or 32. However, it is to be understood that P may be equal to any other suitable number. In an embodiment, P may be equal to N.

In a further embodiment of the present disclosure, each of the pipeline FT circuits is configured to process the M samples based on a radix-M algorithm. For example, each pipeline FT circuit may comprise at least one pipeline FT sub-circuit that is configured to perform the radix-M algorithm.

In an embodiment, each pipeline FT circuit may comprise q pipeline FT sub-circuits that are arranged in a series connection. As a result, the length of the respective pipeline FT circuits is equal to $M^q$.

In an embodiment, the length may be adapted by bypassing one or more of the q pipeline FT sub-circuits. In other words, the maximum length obtainable may be $M^q$, and the length may be adapted to be $M^{(q-a)}$ by bypassing a of the pipeline FT sub-circuits, with a being 0 or an integer, and $0 \leq a \leq q$.

An aspect of the present disclosure provides, for example, that each of the pipeline FT circuits comprises a plurality of delay circuits and a plurality of multiplexer circuits. The inventors of the disclosed subject matter recognized that the plurality of delay circuits and the plurality of multiplexer circuits allow for a better utilization of the hardware of the pipeline FT sub-circuits performing the radix-M algorithm. In an embodiment, the use of delay circuits and multiplexer circuits allow to fully utilize multiplication sub-circuits of the pipeline sub-circuits performing the radix-M algorithm in every clock cycle. This way, the hardware resources and energy consumption necessary for the FT circuit are further reduced.

Embodiments of the present disclosure further provide a signal processing circuit. In an embodiment, the signal processing circuit comprises a Fourier transform (FT) circuit. The FT circuit comprises a distribution circuit, a first number N of pipeline FT circuits, and a second number M of parallel FT circuits, wherein N is an integer greater than or equal to 2, and wherein M is an integer greater than or equal to 2. The distribution circuit is configured to receive a plurality of samples and to divide the plurality of samples into N subsets of samples. The distribution circuit is configured to forward each of the N subsets of samples to a dedicated one of the pipeline FT circuits, respectively. The pipeline FT circuits are arranged in parallel to each other, wherein each pipeline FT circuit is configured to process M samples in parallel, thereby obtaining M intermediate samples per pipeline FT circuit. The pipeline FT circuits are configured to forward each of the M intermediate samples to a dedicated one of the M parallel FT circuits, respectively. The parallel FT circuits are arranged in parallel to each other. Each parallel FT circuit is configured to process N intermediate samples in parallel, thereby obtaining N output samples per parallel FT circuit.

Embodiments of the signal processing circuit may comprise the FT circuit according to any one of the embodiments described above. For example, the signal processing circuit may be integrated into a test and/or measurement instrument, such as a spectrum analyzer, a signal analyzer, an oscilloscope, a vector network analyzer, an RF signal direction finder, a satellite monitoring device, a wireless communications tester, an electromagnetic compatibility tester, etc. However, it is to be understood that the signal processing circuit may be integrated into any other suitable type of test and/or measurement instrument. As another example, the signal processing circuit may be or be integrated into a filter circuit that is configured to equalize an input signal.

Regarding the further advantages and properties of the signal processing circuit, reference is made to the explanations given above with respect to the FT circuit, which also hold for the signal processing circuit and vice versa.

In an embodiment of the present disclosure, the signal processing circuit further comprises at least one analog-to-digital converter (ADC) circuit, wherein the at least one ADC circuit is configured to digitize an analog input signal, thereby obtaining the plurality of samples, and wherein the at least one ADC circuit is configured to forward the plurality of samples to the FT circuit. Accordingly, the FT circuit may perform an FFT of the digitized input signal in real time based on the plurality of samples received from the at least one ADC circuit.

According to another aspect of the present disclosure, the signal processing circuit further comprises, for example, at least one memory, wherein the plurality of samples is stored in the at least one memory, and wherein the at least memory is configured to forward the plurality of samples to the FT circuit. Thus, the FT circuit may perform an FFT of a digitized input signal saved in the memory based on the plurality of samples received from the at least one memory.

In an embodiment, the memory may be a non-transitory memory. Of course, the output samples of the parallel FT circuits may be saved in the memory.

In an embodiment, the signal processing circuit may further comprise a multiplication circuit, wherein the multiplication circuit is arranged between the pipeline FT circuits and the parallel FT circuits, and wherein the multiplication circuit is configured to multiply M*N or M*(N−1) of the intermediate samples with a twiddle factor, respectively. In an embodiment, different intermediate samples may be multiplied with different twiddle factors $W\_N^k=e^{\wedge}(-j \cdot 2\pi k/N)$, as described above.

In a further embodiment of the present disclosure, lengths of the pipeline FT circuits are adjustable. By adjusting the lengths of the pipeline FT circuits, the length of the FT performed by the FT circuit can be adapted, for example during operation of the FT circuit.

In an embodiment, all pipeline FT circuits may have the same length. Accordingly, the length of all pipeline FT circuits may be adapted simultaneously.

In an embodiment, the lengths may each be greater than or equal to 1, for example greater than or equal to 2. Thus, the lengths of the pipeline FT circuits may be adjustable to have an arbitrary length greater than or equal to 1, for example greater than or equal to 2.

Optionally, the lengths may have an upper limit. For example, the lengths may be smaller than or equal to 2048, or smaller than or equal to 4096. Thus, in an example, the length of the pipeline FT circuits may be adjustable within the range between and including 1 or 2, up to and including 2048 or 4096. In an embodiment, the length of the pipeline FT circuits may be equal to $M^{\wedge}q$, wherein q is 0 or an integer. However, it is to be understood that the pipeline FT circuits may have any other length.

Thus, in a particular example, the length of the FFT performed by the FT circuit may be adjusted between 1*M*P and 4096*M*P, wherein P is the respective parallelism of the parallel FT circuits. However, it is to be understood that the upper limit is optional. For example, P may be equal to 4, 8, 16, or 32. However, it is to be understood that P may be equal to any other suitable number.

In a further embodiment of the present disclosure, each of the pipeline FT circuits is configured to process the M samples based on a radix-M algorithm. For example, each pipeline FT circuit may comprise at least one pipeline FT sub-circuit that is configured to perform the radix-M algorithm.

In an embodiment, each pipeline FT circuit may comprise q pipeline FT sub-circuits that are arranged in a series connection. As a result, the length of the respective pipeline FT circuits is equal to $M^{\wedge}q$.

In an embodiment, the length may be adapted by bypassing one or more of the q pipeline FT sub-circuits. In other words, the maximum length obtainable may be $M^{\wedge}q$, and the length may be adapted to be $M^{\wedge}(q-a)$ by bypassing a of the pipeline FT sub-circuits, with a being 0 or an integer, and $0 \leq a \leq q$.

Each of the pipeline FT circuits may comprise a plurality of delay circuits and a plurality of multiplexer circuits. The inventors have recognized that the plurality of delay circuits and the plurality of multiplexer circuits allow for a better utilization of the hardware of the pipeline FT sub-circuits performing the radix-M algorithm. The use of delay circuits and multiplexers has allowed to fully utilize multiplication sub-circuits of the pipeline sub-circuits performing the radix-M algorithm in every clock cycle. This way, the hardware resources and energy consumption necessary for the FT circuit according to the present disclosure are further reduced.

Embodiments of the present disclosure further provide a signal processing method of processing a plurality of samples by a Fourier transform (FT) circuit. The FT circuit comprises a distribution circuit, a first number N of pipeline FT circuits, and a second number M of parallel FT circuits, wherein N is an integer greater than or equal to 2, and wherein M is an integer greater than or equal to 2. In an embodiment, the signal processing method comprises receiving, by the distribution circuit, the plurality of samples; dividing, by the distribution circuit, the plurality of samples into N subsets of samples; forwarding, by the distribution circuit, each of the N subsets of samples to a dedicated one of the pipeline FT circuits, respectively; processing, by each of the pipeline FT circuits, M samples in parallel, thereby obtaining M intermediate samples per pipeline FT circuit; forwarding, by each of the pipeline FT circuits, each of the M intermediate samples to a dedicated one of the M parallel FT circuits, respectively; and processing, by each of the parallel FT circuits, N intermediate samples in parallel, thereby obtaining N output samples per parallel FT circuit.

The FT circuit according to any one of the embodiments described above may be configured to perform the signal processing method. Alternatively or additionally, the signal processing circuit according to any one of the embodiments described above may be configured to perform the signal processing method.

Regarding the further advantages and properties of the signal processing method, reference is made to the explanations given above with respect to the FT circuit and the signal processing circuit, which also hold for the signal processing method and vice versa.

The signal processing method may further comprise the step of multiplying, by a multiplication circuit, M*N or M*(N−1) of the intermediate samples with a twiddle factor, respectively. In an embodiment, different intermediate samples may be multiplied with different twiddle factors $W\_N^k=e^{\wedge}(-j=2\pi k/N)$, as described above.

According to an aspect of the present disclosure, lengths of the pipeline FT circuits are adjustable. By adjusting the lengths of the pipeline FT circuits, the length of the FT performed by the FT circuit can be adapted, for example during operation of the FT circuit.

In an embodiment, the plurality of samples is received from at least one analog-to-digital converter circuit that is provided upstream of the FT circuit or from at least one memory that is provided upstream of the FT circuit. Accordingly, the FT circuit may perform an FFT of the digitized input signal in real time based on the plurality of samples received from the at least one ADC circuit. Alternatively or additionally, the FT circuit may perform an FFT of a digitized input signal saved in the memory based on the plurality of samples received from the at least one memory.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
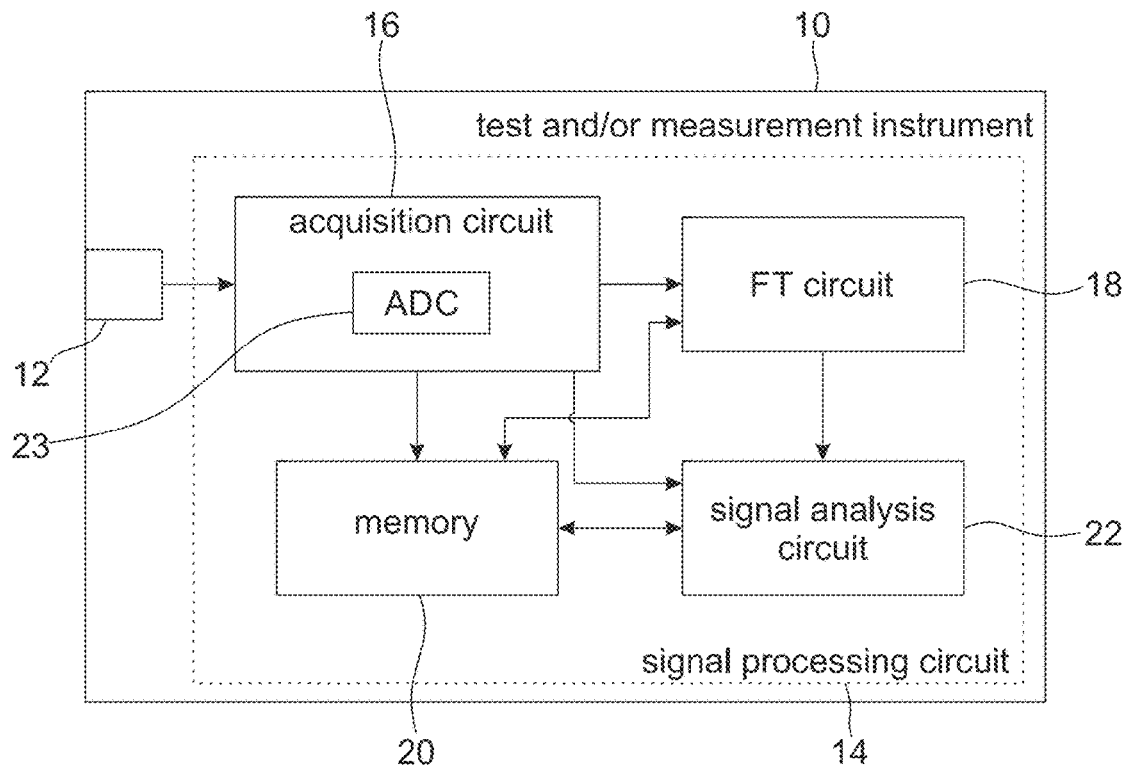
FIG. 1 schematically shows a test and/or measurement instrument with a signal processing circuit according to an embodiment of the present disclosure.

FIG. 1 schematically shows a test and/or measurement instrument 10 comprising at least one signal input 12 and a signal processing circuit 14. In the example shown in FIG. 1, the test and/or measurement instrument 10 may be a spectrum analyzer, a signal analyzer, or an oscilloscope. However, it is to be understood that the test and/or measurement instrument 10 may be any other suitable type of instrument, e.g., a vector network analyzer, an RF signal direction finder, a satellite monitoring device, a wireless communications tester, an electromagnetic compatibility tester, etc.

As shown in FIG. 1, the signal input 12 is configured to receive an analog input signal, e.g. from a device under test, and to forward the analog input signal received to the signal processing circuit 14. In the embodiment shown in FIG. 1, the signal processing circuit 14 comprises a signal acquisition circuit 16, an FT circuit 18, a memory 20, and a signal analysis circuit 22.

In general, the signal acquisition circuit 16 is configured to pre-process the analog input signal received from the signal input 12. For example, the signal acquisition circuit 16 may comprise a mixer circuit that is configured to down-convert a frequency of the input signal to an intermediate frequency. Further, the signal acquisition circuit 16 comprises an analog-to-digital converter circuit 23 that is configured to digitize the (down-converted) analog input signal, thereby obtaining a digitized input signal comprising a plurality of samples.

The digitized input signal is forwarded to the FT circuit 18, saved in the memory 20, and/or forwarded to the signal analysis circuit 22. If the digitized input signal is saved in the memory 20, the digitized input signal may be forwarded from the memory 20 to the FT circuit 18 and/or to the signal analysis circuit 22 later. In an embodiment, the memory 20 may be a non-transitory memory.

In general, the FT circuit 18 is configured to perform an FFT on the digitized input signal, thereby obtaining an output signal comprising a plurality of output samples. Accordingly, the output signal of the FT circuit 18 is the FT of the digitized input signal. The output signal of the FT circuit 18 may be saved in the memory 20 and/or forwarded to the signal analysis circuit 22.

The signal analysis circuit 22 is configured to analyze the digitized input signal and/or the output signal of the FT circuit 18, thereby obtaining at least one measurement parameter. The measurement parameter depends on the type of measurement conducted by the test and/or measurement instrument 10.

Figure 2:
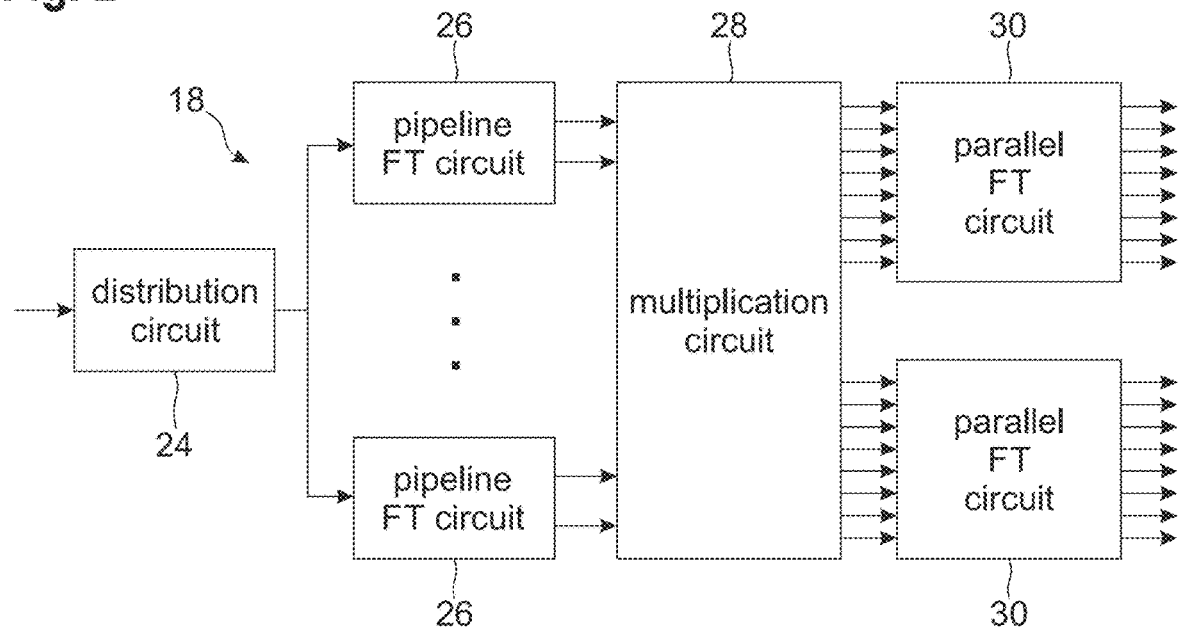
FIG. 2 schematically shows an FT circuit according to an embodiment of the present disclosure.

FIG. 2 schematically shows an example of the FT circuit 18 in more detail. As shown in FIG. 2, the FT circuit 18 comprises a distribution circuit 24 that is configured to receive the digitized input signal. The FT circuit 18 further comprises a first number N of pipeline FT circuits 26, wherein N is an integer greater than or equal to 2. The pipeline FT circuits 26 are arranged in parallel to each other, and are each connected to the distribution circuit 24 downstream of the distribution circuit 24.

As shown in FIG. 2, the FT circuit 26 may further comprise a multiplication circuit 28 that is provided downstream of the pipeline FT circuits 26. In the example embodiment shown in FIG. 2, the multiplication circuit 28 is connected to all of the pipeline FT circuits 26. However, as will be described in more detail below, the multiplication circuit 28 may alternatively only be connected to (N−1) of the pipeline FT circuits 26.

In an embodiment, the FT circuit 26 further comprises a second number M of parallel FT circuits 30, wherein M is an integer greater than or equal to 2. In the example embodiment shown in FIG. 2, M is equal to 2. The parallel FT circuits 30 are arranged in parallel to each other, and are each connected to the multiplication circuit 28 downstream of the multiplication circuit 28.

Figure 3:
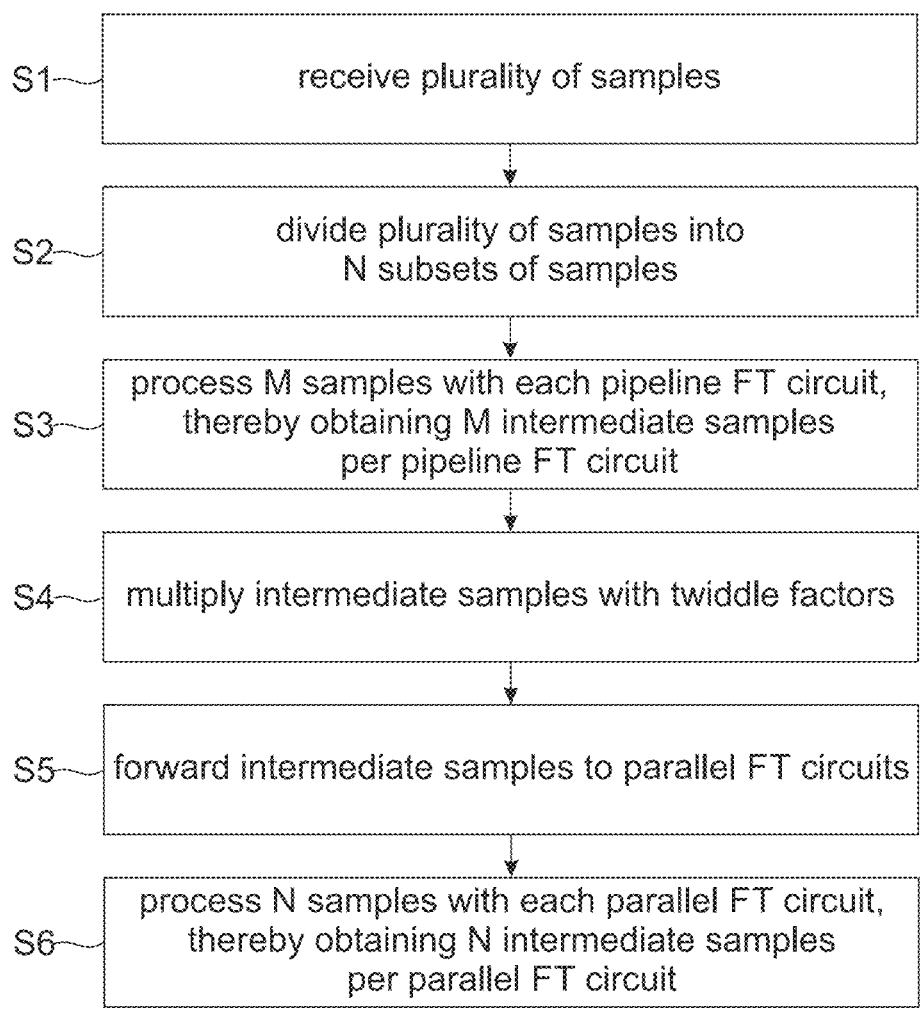
FIG. 3 shows an example flow chart of a signal processing method according to an embodiment of the present disclosure.

The signal processing circuit 14 or the FT circuit 18 is configured to perform a signal processing method of processing a plurality of samples, an example of which is described hereinafter with reference to FIG. 3.

A plurality of samples is received by the distribution circuit 24 (step S1). The plurality of samples may correspond to the digitized input signal described above.

The plurality of samples is divided into N subsets of samples by the distribution circuit 24, and each subset of samples is forwarded to a dedicated one of the N pipeline FT circuits 26 (step S2). Accordingly, each pipeline FT circuit 26 receives and processes exactly one of the N subsets of samples. Therein, the plurality of input samples may be distributed equally into the N subsets of samples, such that each subset of samples comprises M or more samples.

Figure 4:
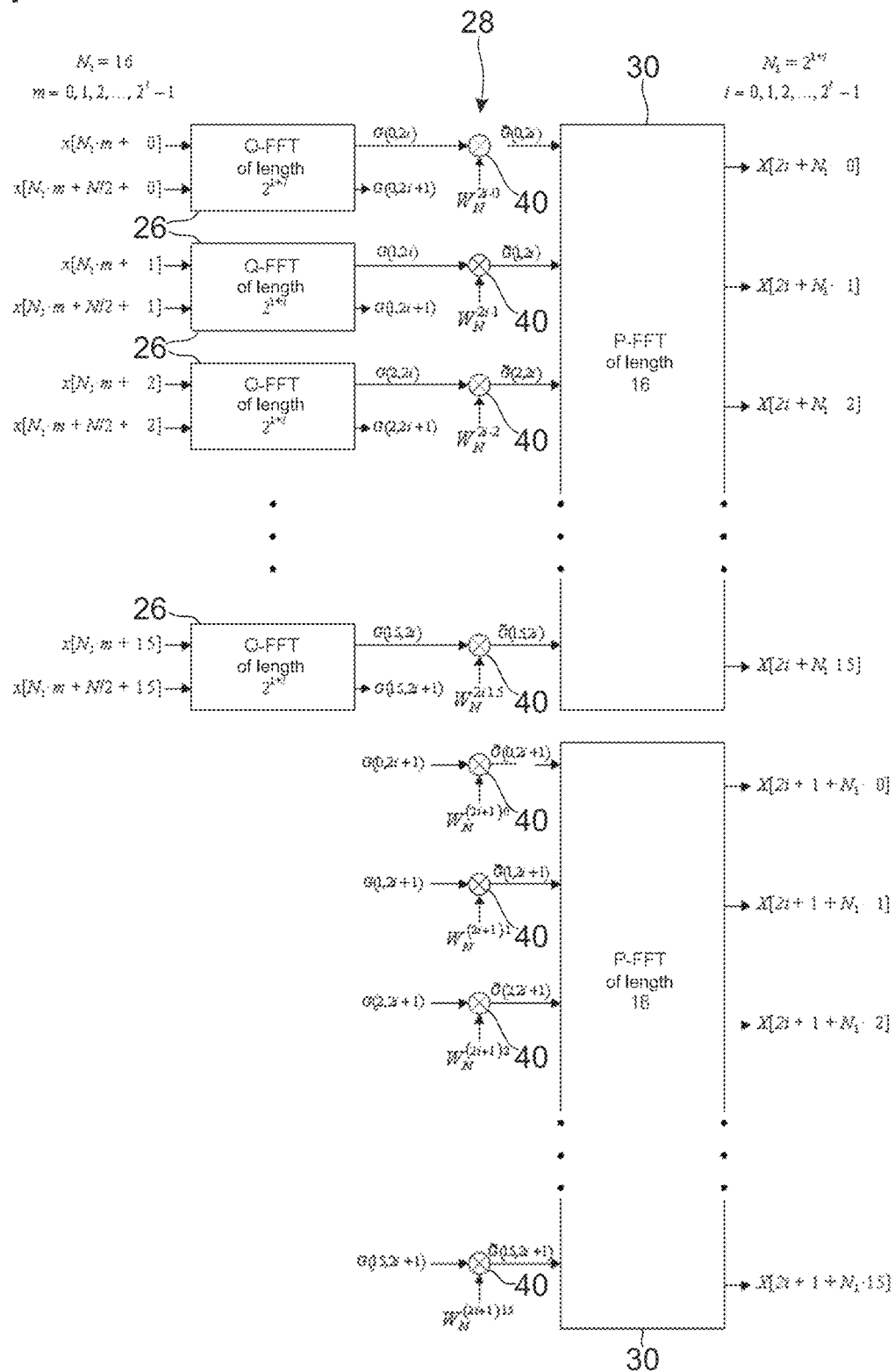
FIG. 4 schematically shows an example embodiment of the FT circuit of FIG. 2.

An example embodiment of the FT circuit 18 downstream of the distribution circuit 24 is shown in FIG. 4, which shows the exemplary case of N=16 and M=2. Accordingly, there are N=16 pipeline FT circuits 26 that each receive and process M=2 samples simultaneously. Without restriction of generality, this example is described hereinafter.

The M samples are processed by each of the pipeline FT circuits 26 in parallel, thereby obtaining M intermediate samples per pipeline FT circuit 26 (step S3). In an embodiment, the pipeline FT circuits 26 may each perform a FFT of length $M\hat{}q=M\hat{}(1+l)$ on the samples received. In an embodiment, the length of the FFT performed by the pipeline FT circuits 26 is adjustable. For example, the length of all pipeline FT circuits 26 may be adapted simultaneously, such that all pipeline FT circuits 26 have the same length.

In an embodiment, the length of the pipeline FT circuits 26 may be adjustable within the range between and including 1, for example 2, up to and including 2048 or 4096. However, it is to be understood that the upper limit is optional.

For example, each pipeline FT circuit 26 may comprise q pipeline FT sub-circuits that are arranged in a series connection. As a result, the length of the respective pipeline FT circuits is equal to $M\hat{}q$.

In an embodiment, the length may be adapted by bypassing one or more of the q pipeline FT sub-circuits. In other words, the maximum length obtainable may be $M\hat{}q$, and the length may be adapted to be $M\hat{}(q-a)$ by bypassing a of the pipeline FT sub-circuits, with a being 0 or an integer, and with $0 \leq a \leq q$.

In an embodiment, the pipeline FT circuits 26 may each process the M samples based on a radix-M algorithm. More precisely, each stage, i.e. each pipeline FT sub-circuit, may perform a radix-M operation.

Figure 5:
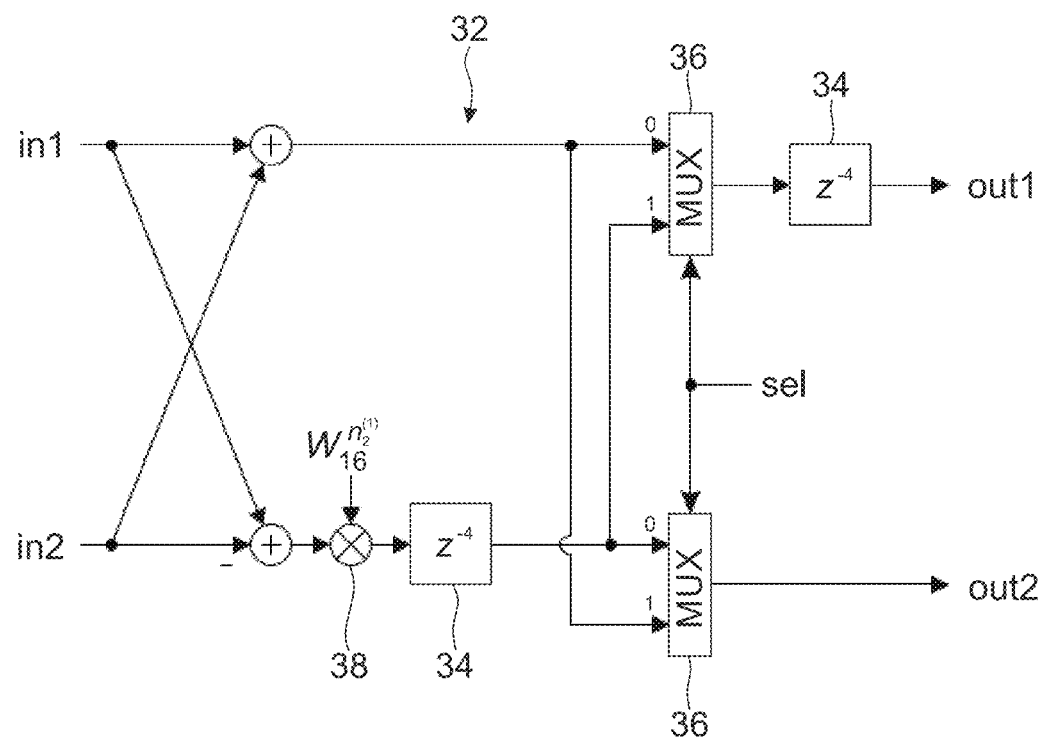
FIG. 5 schematically shows an example embodiment of a pipeline FT circuit of the FT circuit of FIG. 4.

FIG. 5 shows an example pipeline FT sub-circuit 32 for the case of M=2, i.e. the pipeline FT sub-circuit 32 performs a radix-2 operation. As shown in FIG. 5, the pipeline FT sub-circuit 32 comprises two delay circuits 34 as well as two multiplexer circuits 36, which allow to utilize a multiplication sub-circuit 38 of the pipeline FT sub-circuit 32 in every clock cycle.

M*N or M*(N−1) of the intermediate samples are forwarded to the multiplication circuit 28 and multiplied with a twiddle factor, respectively (step S4). In the example embodiment shown in FIG. 4, all M*N intermediate samples are forwarded to the multiplication circuit 28.

In an embodiment, each intermediate sample is forwarded to a dedicated one of M*N multiplication sub-circuits 40 of the multiplication circuit 28. The multiplication sub-circuits 40 multiply each intermediate sample with a corresponding twiddle factor $W\_N^k = e^{(-j-2\pi k/N)}$, wherein M of the twiddle factors are equal to 1.

However, it is also conceivable that the corresponding M intermediate samples that would be multiplied with 1 are not fed to a multiplication sub-circuit 40, but are instead forwarded to the parallel FT circuits 30 directly. In this case, the multiplication circuit 28 may comprise M*(N−1) multiplication sub-circuits 40.

The M*N intermediate samples, multiplied with the corresponding twiddle factors, are forwarded to the parallel FT circuits 30 (step S5). For example, the M intermediate samples generated by each pipeline FT circuit 26 are forwarded to different ones of the M parallel FT circuits 30, such that each parallel FT circuit 30 receives exactly one intermediate sample from each pipeline FT circuit 26. Accordingly, each parallel FT circuit 30 receives N intermediate samples from the N different pipeline FT circuits 26.

Each parallel FT circuit 30 processes the received N intermediate samples in parallel, thereby obtaining N output samples per parallel FT circuit 30 (step S6). In an embodiment, each parallel FT circuit 30 performs an FFT of length N on the received intermediate samples, thereby obtaining the output samples.

The output samples correspond to an output signal of the FT circuit 18, wherein the output signal is the Fourier transform of the digitized input signal received by the distribution circuit 24.

In the embodiments described above, the FT circuit 18 is integrated into the test and/or measurement instrument 10 and used for signal analysis of an analog input signal received by the test and/or measurement instrument 10. However, the explanations given above likewise hold for different applications of the FT circuit 18, such as in an equalizer, for example in a finite impulse response (FIR) filter.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Of course, in an embodiment, two or more of these components, or parts thereof, can be integrated or share hardware and/or software, circuitry, etc. In an embodiments, these components, or parts thereof, may be grouped in a single location or distributed over a wide area. In circumstances where the components are distributed, the components are accessible to each other via communication links.

In an embodiments, one or more of the components, such as the a signal processing circuit 14, etc., referenced above include circuitry programmed to carry out one or more steps of any of the methods disclosed herein. In an embodiments, one or more computer-readable media associated with or accessible by such circuitry contains computer readable instructions embodied thereon that, when executed by such circuitry, cause the component or circuity to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible to a computing device, such as processor circuitry, etc., or other circuity disclosed herein etc. In other words, a computer-readable medium is a non-transitory memory at which one or more computing devices can access instructions, codes, data, or other information. As a nonlimiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiment of the invention in which an exclusive property or privilege is claimed and defined as follows:

1. A Fourier transform (FT) circuit, the FT circuit comprising:
   a distribution circuit, a first number N of pipeline FT circuits, and a second number M of parallel FT circuits, wherein N is an integer greater than or equal to 2, wherein M is an integer greater than or equal to 2,
   wherein the distribution circuit is configured to receive a plurality of samples and to divide the plurality of samples into N subsets of samples, and wherein the distribution circuit is configured to forward each of the N subsets of samples to a dedicated one of the pipeline FT circuits, respectively,
   wherein the pipeline FT circuits are arranged in parallel to each other, wherein each pipeline FT circuit is configured to process M samples in parallel, thereby obtaining M intermediate samples per pipeline FT circuit, and wherein the pipeline FT circuits are configured to forward each of the M intermediate samples to a dedicated one of the M parallel FT circuits, respectively,
   wherein the parallel FT circuits are arranged in parallel to each other, and wherein each parallel FT circuit is configured to process N intermediate samples in parallel, thereby obtaining N output samples per parallel FT circuit.

2. The FT circuit of claim 1, further comprising a multiplication circuit, wherein the multiplication circuit is arranged between the pipeline FT circuits and the parallel FT circuits, and wherein the multiplication circuit is configured to multiply M*N or M*(N−1) of the intermediate samples with a twiddle factor, respectively.

3. The FT circuit of claim 1, wherein lengths of the pipeline FT circuits are adjustable.

4. The FT circuit of claim 3, wherein all pipeline FT circuits have the same length.

5. The FT circuit of claim 3, wherein the lengths are each greater than or equal to 1 or greater than or equal to 2.

6. The FT circuit of claim 1, wherein each of the pipeline FT circuits is configured to process the M samples based on a radix-M algorithm.

7. The FT circuit of claim 6, wherein each of the pipeline FT circuits comprises a plurality of delay circuits and a plurality of multiplexer circuits.

8. A signal processing circuit, the signal processing circuit comprising a Fourier transform (FT) circuit, the FT circuit comprising a distribution circuit, a first number N of pipeline FT circuits, and a second number M of parallel FT circuits, wherein N is an integer greater than or equal to 2, wherein M is an integer greater than or equal to 2,
    wherein the distribution circuit is configured to receive a plurality of samples and to divide the plurality of samples into N subsets of samples, and wherein the distribution circuit is configured to forward each of the N subsets of samples to a dedicated one of the pipeline FT circuits, respectively,
    wherein the pipeline FT circuits are arranged in parallel to each other, wherein each pipeline FT circuit is configured to process M samples in parallel, thereby obtaining M intermediate samples per pipeline FT circuit, and wherein the pipeline FT circuits are configured to forward each of the M intermediate samples to a dedicated one of the M parallel FT circuits, respectively,
    wherein the parallel FT circuits are arranged in parallel to each other, and wherein each parallel FT circuit is configured to process N intermediate samples in parallel, thereby obtaining N output samples per parallel FT circuit.

9. The signal processing circuit of claim 8, further comprising at least one analog-to-digital converter (ADC) circuit, wherein the at least one ADC circuit is configured to digitize an analog input signal, thereby obtaining the plurality of samples, and wherein the at least one ADC circuit is configured to forward the plurality of samples to the FT circuit.

10. The signal processing circuit of claim 8, further comprising at least one memory, wherein the plurality of samples is stored in the at least one memory, and wherein the at least memory is configured to forward the plurality of samples to the FT circuit.

11. The signal processing circuit of claim 8, further comprising a multiplication circuit, wherein the multiplication circuit is arranged between the pipeline FT circuits and the parallel FT circuits, and wherein the multiplication circuit is configured to multiply M*N or M*(N−1) of the intermediate samples with a twiddle factor, respectively.

12. The signal processing circuit of claim 8, wherein lengths of the pipeline FT circuits are adjustable.

13. The signal processing circuit of claim 12, wherein all pipeline FT circuits have the same length.

14. The signal processing circuit of claim 12, wherein the lengths are each greater than or equal to 1 or greater than or equal to 2.

15. The signal processing circuit of claim 8, wherein each of the pipeline FT circuits is configured to process the M samples based on a radix-M algorithm.

16. The signal processing circuit of claim 15, wherein each of the pipeline FT circuits comprises a plurality of delay circuits and a plurality of multiplexer circuits.

17. A signal processing method of processing a plurality of samples by a Fourier transform (FT) circuit, the FT circuit comprising a distribution circuit, a first number N of pipeline FT circuits, and a second number M of parallel FT circuits, wherein N is an integer greater than or equal to 2, and wherein M is an integer greater than or equal to 2, the signal processing method comprising:
    receiving, by the distribution circuit, the plurality of samples;
    dividing, by the distribution circuit, the plurality of samples into N subsets of samples;
    forwarding, by the distribution circuit, each of the N subsets of samples to a dedicated one of the pipeline FT circuits, respectively;
    processing, by each of the pipeline FT circuits, M samples in parallel, thereby obtaining M intermediate samples per pipeline FT circuit;
    forwarding, by each of the pipeline FT circuits, each of the M intermediate samples to a dedicated one of the M parallel FT circuits, respectively; and
    processing, by each of the parallel FT circuits, N intermediate samples in parallel, thereby obtaining N output samples per parallel FT circuit.

18. The signal processing method of claim 17, further comprising multiplying, by a multiplication circuit, M*N or M*(N−1) of the intermediate samples with a twiddle factor, respectively.

19. The signal processing method of claim 17, wherein lengths of the pipeline FT circuits are adjustable.

20. The signal processing method of claim 17, wherein the plurality of samples is received from at least one analog-to-digital converter circuit that is provided upstream of the FT circuit or from at least one memory that is provided upstream of the FT circuit.

* * * * *